(12) United States Patent
Schade et al.

(10) Patent No.: US 10,247,583 B2
(45) Date of Patent: Apr. 2, 2019

(54) FIBER-OPTIC SENSOR AND METHOD FOR THE PRODUCTION AND USE THEREOF

(71) Applicant: Fraunhofer-Gesellschaft zur Förderung der angewandten Forschung e.V., Munich (DE)

(72) Inventors: Wolfgang Schade, Goslar (DE); Christian Waltermann, Goslar (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 188 days.

(21) Appl. No.: 15/321,562

(22) PCT Filed: Jun. 23, 2015

(86) PCT No.: PCT/EP2015/064062
§ 371 (c)(1),
(2) Date: Dec. 22, 2016

(87) PCT Pub. No.: WO2015/197592
PCT Pub. Date: Dec. 30, 2015

(65) Prior Publication Data
US 2017/0160109 A1 Jun. 8, 2017

(30) Foreign Application Priority Data

Jun. 23, 2014 (DE) .................. 10 2014 211 918

(51) Int. Cl.
*H01J 40/14* (2006.01)
*G01D 5/353* (2006.01)

(52) U.S. Cl.
CPC ....... *G01D 5/35316* (2013.01); *G01D 5/3538* (2013.01)

(58) Field of Classification Search
CPC .............. G01D 5/353; G01D 5/35316; G02B 6/02057; G02B 6/02076
(Continued)

(56) References Cited

U.S. PATENT DOCUMENTS

| 5,848,204 A | 12/1998 | Wanser |
| 7,499,605 B1 | 3/2009 | Xia et al. |

(Continued)

FOREIGN PATENT DOCUMENTS

| WO | WO 2005/111677 A2 | 11/2005 |
| WO | WO 2011/154701 A1 | 12/2011 |
| WO | WO 2014/086708 A1 | 6/2014 |

OTHER PUBLICATIONS

International Search Report with English translation, dated Sep. 18, 2015, pp. 1-7, issued in International Application PCT/EP2015/064062, European Patent Office, Rijswijk, The Netherlands.

*Primary Examiner* — Kevin K Pyo
(74) *Attorney, Agent, or Firm* — Brinks Gilson & Lione

(57) ABSTRACT

A fiber optic sensor may be provided comprising an optical waveguide having at least one first core and a cladding surrounding the first core, wherein the first core extends substantially over the entire length of the optical waveguide and at least one Bragg grating is introduced into the first core, wherein the Bragg grating has an elongated cross section, wherein the short semi-axis is smaller than the diameter of the first core and the center of gravity of the cross section of the at least one Bragg grating lies on the axis of symmetry of the optical waveguide. A method may be provided for determining torsion with such a sensor. A method for the production of such a sensor may be provided.

14 Claims, 4 Drawing Sheets

(58) Field of Classification Search
USPC ...... 250/227.11, 227.14, 227.17; 385/10, 12; 372/102, 106
See application file for complete search history.

(56) References Cited

U.S. PATENT DOCUMENTS

| | | |
|---|---|---|
| 7,587,110 B2 | 9/2009 | Singh et al. |
| 2003/0165176 A1* | 9/2003 | Minden ............... H01S 3/09415 372/108 |
| 2004/0234218 A1 | 11/2004 | Tao et al. |
| 2007/0230861 A1 | 10/2007 | Khrushchev et al. |
| 2010/0139405 A1* | 6/2010 | Melikechi ............. G01H 9/004 73/655 |
| 2010/0329602 A1 | 12/2010 | Shah et al. |
| 2014/0053654 A1 | 2/2014 | Rogge et al. |

* cited by examiner a)　　　　　　　　　　　　b)

FIBER-OPTIC SENSOR AND METHOD FOR THE PRODUCTION AND USE THEREOF

CROSS-REFERENCE TO RELATED APPLICATIONS

This application is a 371 nationalization of PCT/EP2015/064062, entitled "FIBRE-OPTIC SENSOR AND METHOD FOR THE PRODUCTION AND USE THEREOF," having an international filing date of Jun. 23, 2015, the entire contents of which are hereby incorporated by reference, which in turn claims priority under 35 USC § 119 to German patent application DE 10 2014 211 918.9 filed on Jun. 23, 2014, entitled "Faseroptischer Sensor sowie Verfahren zu dessen Herstellung and Verwendung," the entire contents of which are hereby incorporated by reference.

BACKGROUND

A fiber optic sensor with which the curvature of a body or a mechanical component can be determined is known from US 2007/0297712 A1. For this purpose, the fiber optic sensor has a plurality of cores which are surrounded by a common cladding. Bragg gratings are disposed in the cores, so that different mechanical compressive and tensile stresses can be determined if the fiber is curved. The curvature of the fiber, and with it the position of the fiber end in the space, can be thus be determined.

This known fiber optic sensor has the disadvantage, however, that the measurement values can be corrupted by torsion of the sensor about its longitudinal axis. The known sensor is not suited to distinguish between torsion and curvature, because they both result in the same change in the lattice constants of the Bragg grating.

DETAILED DESCRIPTION

Figure 1:
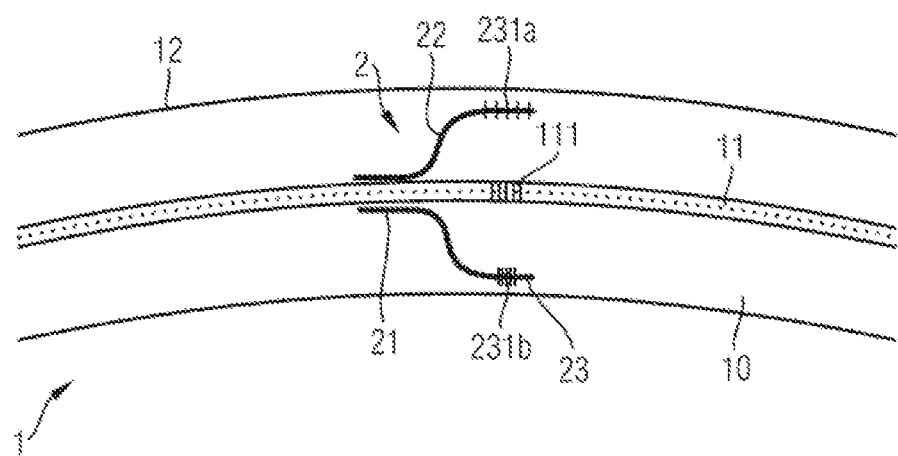
FIG. 1 shows a section from a first embodiment of a fiber optic sensor.

Based on the state of the art, the underlying task of the invention is therefore to provide a fiber optic sensor for determining mechanical stresses, temperatures and/or deformations with increased accuracy.

The invention concerns a fiber optic sensor with an optical waveguide, the optical waveguide having at least one first core and a cladding surrounding the first core, wherein the first core extends substantially over the entire length of the optical waveguide and at least one Bragg grating is introduced into the first core. The invention further concerns a method for producing a fiber optic sensor, in which an optical waveguide having at least one first core and a cladding surrounding the first core is provided, wherein the first core extends substantially over the entire length of the optical waveguide and at least one Bragg grating is introduced into the first core by means of laser light irradiation. Finally, the invention concerns a method for determining torsion, in which a fiber optic sensor is used. Devices and methods of the type mentioned at the outset can be used to determine temperatures, active forces or the shape of a mechanical component.

The invention proposes the use of a fiber optic sensor for the measurement of mechanical stresses, temperatures and/or deformations. The fiber optic sensor contains an optical fiber which has at least one first core and a cladding surrounding the first core. The core and the cladding can be made of glass or plastic. At least the core is transparent for a specifiable wavelength range of the electromagnetic spectrum, so that light of this wavelength or this wavelength range can spread in the core. The core and the cladding respectively have different refractive indices, resulting in total reflection of the light propagating in the core at the boundary between the core and the cladding.

In some embodiments of the invention, the core can transition continuously into the cladding, so that there is no formation of a geometrically defined boundary. In this case, the core can be understood to be the area of the space in which the light is propagating.

The at least one first core extends substantially over the entire length of the optical waveguide, so that light can be coupled into or out of the optical waveguide from one end of the optical waveguide or from both ends. In some embodiments of the invention, this optical waveguide can be disposed concentrically to the cladding and thereby on the axis of symmetry of a cylindrical optical waveguide. In some embodiments of the invention a standard fiber from telecommunication technology can be used for the production of the sensor. During operation of the sensor, light from a light source is coupled in at least intermittently and the light transmitted through or reflected by the Bragg grating is coupled out of the waveguide and spectrally analyzed. A superluminescent diode is an example of a suitable light source.

At least one Bragg grating is introduced into the first core. The Bragg grating can be created, for example, by modifying the material of the core by means of laser radiation. In some embodiments of the invention, the laser radiation can be pulsed, for example with a pulse length of less than 10 ns, less than 1 ns or less than 100 fs. In other embodiments of the invention, the Bragg grating can be created by doping the material of the core. In each case, the Bragg grating comprises a plurality of spatially bounded areas, the refractive index of which differs from the refractive index of the surrounding material of the core. As a result, a portion of the light propagating in the core is reflected at the respective boundaries and a portion is transmitted. A number of such modified regions with a specifiable spacing form a Bragg grating, which reflects a wavelength range of the incident light and transmits the radiation of other wavelength ranges as a function of its lattice constant. The lattice constant is defined by the spacing of the modified areas. When the temperature changes or under the action of mechanical stresses, the Bragg grating is stretched or compressed, so that the lattice constant changes and can be determined by means of spectroscopic analysis of the transmitted or reflected light.

If the fiber optic sensor is subjected to deformation in at least one spatial direction and torsion about its longitudinal axis, the resulting mechanical stress cannot be recorded separately in the known fiber optic sensors. Unrecognized torsional load on the known fiber optic sensor therefore leads to a corruption of the measurement signal.

Inventively it is now proposed that the Bragg grating, or the individual spatial areas forming the Bragg grating, has an elongated cross section, wherein the short semi-axis is smaller than the diameter of the first core. For the purposes of the present invention, an elongated cross section is any shape that is not rotationally symmetric about an axis defined by the longitudinal extension of the optical waveguide. In the simplest case, the individual spatial areas forming the Bragg grating can be spheroids. This feature has the effect that the intensity of the light reflected or transmitted by the Bragg grating is a function of its polarization direction. By irradiation of polarized light, the intensity of the reflected light can therefore be used as a measure of the torsion, while a measurement signal for the mechanical stress and/or temperature can be derived from the wavelength of the reflected light.

If there is a plurality of Bragg gratings at different distances to the axis of symmetry of the optical waveguide, the curvature of the fiber optic sensor, and with it the shape of a component connected to the sensor, can be determined from the various mechanical stresses as well. Since mechanical stresses measured in a per se known manner can now be corrected by the amount resulting from torsion of the fiber optic sensor, active forces and/or shape can be determined with higher accuracy. Bragg gratings that are at a distance to the axis of symmetry of the optical waveguide can have a per se known, substantially circular cross section.

In some embodiments of the invention there is at least one Bragg grating with an elongated cross section in a core, which extends concentrically to the cladding and thus in the neutral fiber. The geometric center of gravity of the cross section of the Bragg grating can, in some embodiments of the invention, coincide with the geometric center of gravity of the cross section of the waveguide or the optical fiber.

In some embodiments of the invention, the lattice constant of the Bragg grating varies periodically with the torsional stress as well, so that the wavelength of the reflected light can be used to check the plausibility of the measured values.

In some embodiments of the invention, both semi-axes of the elongated cross section of the Bragg grating are smaller than the diameter of the core. In this way, the Bragg grating can be disposed entirely within the core of the fiber optic sensor, which results in increased accuracy in determining the torsion.

In some embodiments of the invention, the fiber optic sensor can comprise a plurality of Bragg gratings with an elongated cross section that are disposed spaced from one another at least in the first core, wherein the orientation of the elongated cross sections is the same. This allows the determination of the torsion at multiple locations along the length of the optical waveguide, so that the total torsion of the fiber optic sensor can be determined with greater accuracy.

In some embodiments of the invention, at least one first core is disposed in a neutral fiber of the optical waveguide. The Bragg grating thus remains free of mechanical stresses, so that the torsion of the optical waveguide can be determined with greater accuracy.

In some embodiments of the invention, the fiber optic sensor comprises a plurality of Bragg gratings, the lattice constants of which are different from one another. The measuring point for mechanical stress and/or torsion can thus be determined based on the wavelength of the reflected or transmitted light. This allows a simple determination of these measured values at multiple locations of the fiber optic sensor in a multiplex procedure.

In some embodiments of the invention, the fiber optic sensor can further comprise at least one second core, which is at least partially surrounded by the cladding, wherein the longitudinal extension of the second core is less than the total length of the optical waveguide and at least one Bragg grating is introduced into the second core. This allows the realization of multiple measuring points along the length of the fiber optic sensor. However, since only a smaller number of first cores are guided to the ends of the fiber optic sensor, a larger number of second cores can be coupled with a light source and/or a spectroscopic signal analysis in a simple manner. This decreases the expense of reading out multiple measuring points with wavelength-division multiplexing and/or time-division multiplexing.

In some embodiments of the invention, Bragg gratings having an elongated cross section are introduced at least partially into the second cores as well, wherein the short semi-axis is smaller than the diameter of the second core. This enables the second cores to synchronously detect torsion and stress.

In some embodiments of the invention, the Bragg gratings of the second core at least partially have a circular cross section. In this case, the inventively proposed elliptical Bragg grating can be disposed in the first core, so that the Bragg gratings of the first core can be used to measure temperature and/or torsion and the Bragg gratings of the second core can be used to measure mechanical stress, and thus determine active forces or deformations.

In some embodiments of the invention, the optical waveguide of the fiber optic sensor is not polarization-maintaining. This means that polarized light propagating in the first core does not change its polarization direction, if there is a relative rotation between the polarization plane and the core of the optical waveguide. In other words, with the exception of the Bragg grating, the core is isotropic, so that the orientation of the core along its longitudinal extension does not affect the polarization plane of the propagating light.

In some embodiments of the measurement method according to the invention, polarized light with a polarization direction that changes cyclically cannot be coupled into the fiber optic sensor. In some embodiments of the invention, the polarization direction can rotate uniformly. The light reflected by at least one Bragg grating then has a temporal change of the intensity, which is coupled to the cyclic change in the polarization of the coupled-in light wave in a phase-locked manner. If the polarization direction rotates uniformly, the rise and fall of the intensity of the reflected light will be sinusoidal. If the fiber is subjected to torsion, there is a phase shift between the temporal progression of the polarization direction of the incoming wave and the temporal progression of the amplitude of the reflected intensity. The amount of torsion can be determined from this phase shift. Alternatively, a phase shift between the temporal progression of the amplitude of the reflected intensity of two different elongated or elliptical fiber Bragg gratings can be determined. The torsion of the longitudinal section between the two Bragg gratings can be determined from this.

In some embodiments of the invention, the inventively proposed Bragg grating with an elliptical cross section can be produced by means of laser material processing. In doing so, the laser radiation can be focused on the core by at least one cylindrical lens. Since material modification with laser radiation is limited to the focal point of the laser beam, an elliptical focus also results in a modified area of space with the shape of a spheroid.

In other embodiments of the invention, at least one Bragg grating of the fiber optic sensor can be created with laser radiation the intensity of which is modulated by at least one intensity mask before arriving at the core. This allows the resulting focus to not be punctiform or spherical, but rather to have a greater longitudinal extension in one spatial direction than in the other spatial direction. In this way the inventively proposed, elongated or elliptical areas of space can be created, thus resulting in the Bragg gratings used in this invention.

The fiber optic sensor according to the invention can, for example, be part of a catheter for medical applications, part of a drilling tool or part of an endoscope. The fiber optic sensor can be connected with the mentioned devices by means of gluing or welding. If a catheter is made of, or contains, a plastic material, the fiber optic sensor can either be embedded during the original molding of the catheter or, through materials processing of a portion of the material of the catheter, be a direct component of this catheter. In some embodiments of the invention, a catheter may be a catheter for brain or cardiac catheterization.

The inventive fiber optic sensor can be used to guide and/or position a tool of a machine tool, such as a lathe or a milling machine or an automatic placement machine. This makes it possible to precisely determine the x, y, z coordinates and the angular coordinates of the tool in space, and to thus align the position of the tool with an associated CAD drawing or direct the position of the tool to a target position taken from a CAD model. In the case of long drilling tools, which tend to get off course in the workpiece or in the ground, the position of the bore, and with it the position of the tool tip in the material or in the ground, can be precisely determined.

The shape of the component connected to the sensor can be determined by measuring the mechanical stresses and torsion of the fiber optic sensor. By specifying one coordinate and based on the known length of a catheter or a drilling tool or an endoscope, the position in space of the tool or the tool tip can be determined, so that exact positioning in the area or in a human or animal body is made possible.

The invention will be explained in more detail in the following with the aid of figures, without limiting the general inventive concept. The figures show FIG. 1 shows a section from a first embodiment of a fiber optic sensor.

Figure 2:
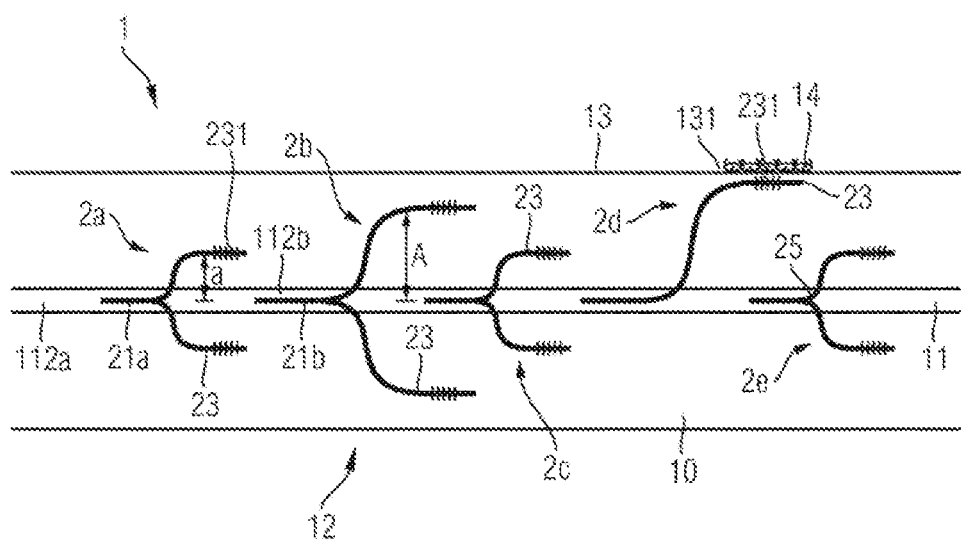
FIG. 2 shows a section from a second embodiment of a fiber optic sensor.

FIG. 2 shows a section from a second embodiment of a fiber optic sensor.

Figure 3:
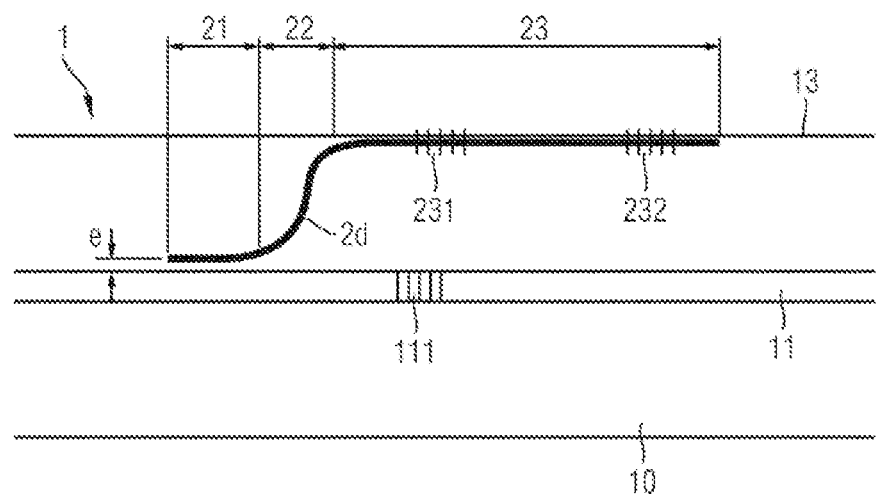
FIG. 3 shows a section from a third embodiment of a fiber optic sensor.

FIG. 3 shows a section from a third embodiment of a fiber optic sensor.

Figure 4:
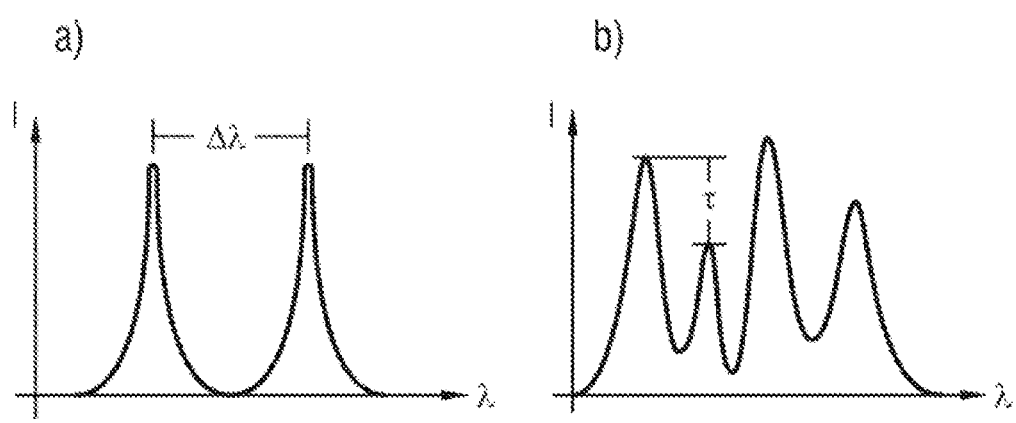
FIG. 4 shows measurement results that can be obtained with a fiber optic sensor according to the invention.

FIG. 4 shows measurement results that can be obtained with a fiber optic sensor according to the invention.

Figure 5:
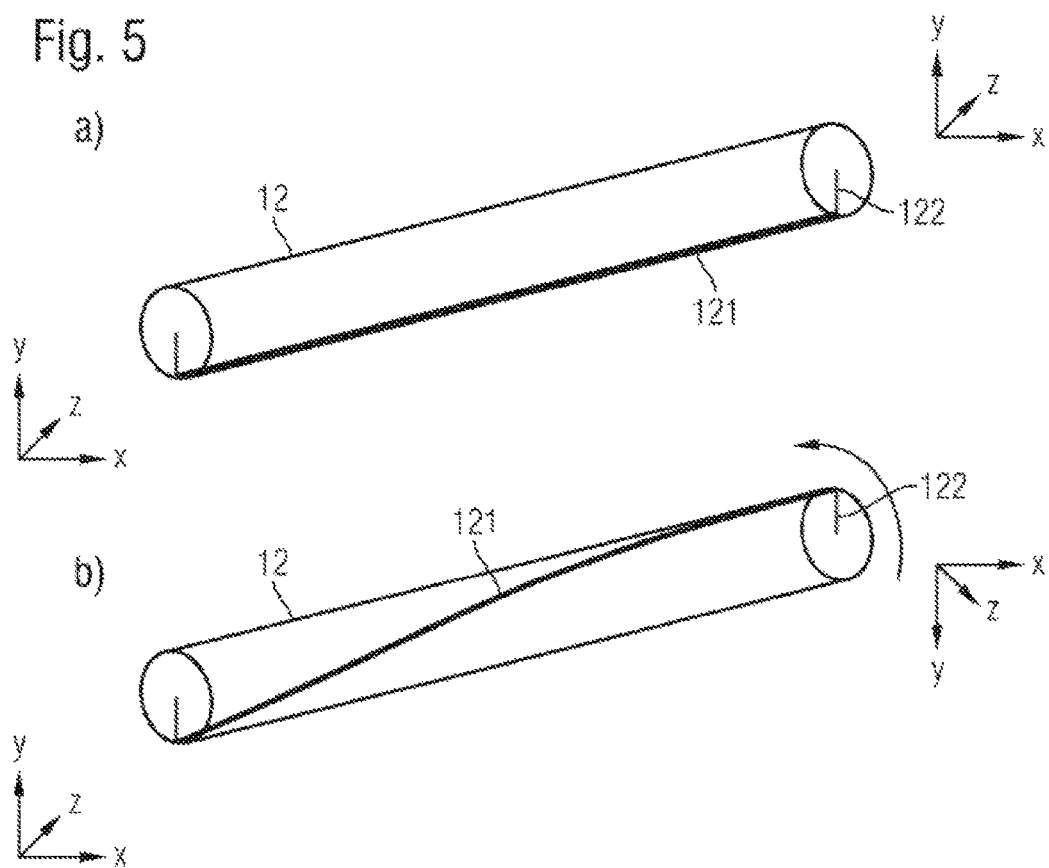
FIG. 5 schematically shows torsion of an optical waveguide.

FIG. 5 schematically shows torsion of an optical waveguide.

Figure 6:
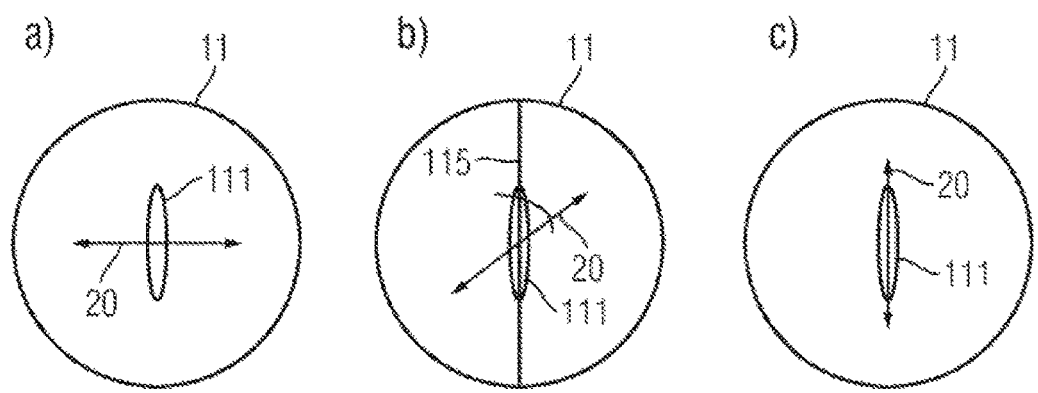
FIG. 6 illustrates the signal attenuation of polarized light at the Bragg gratings according to the invention.

FIG. 6 illustrates the signal attenuation of polarized light at the Bragg gratings according to the invention.

Figure 7:
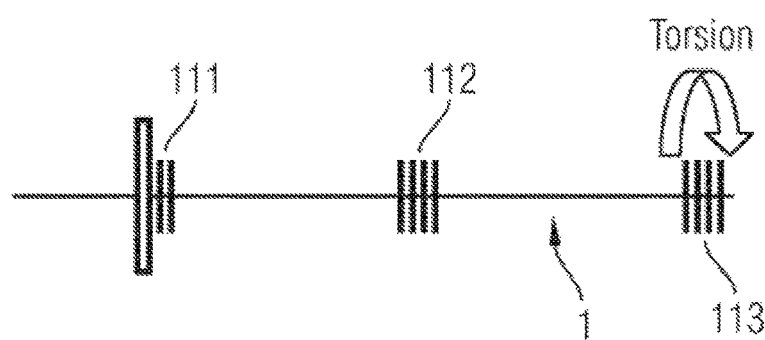
FIG. 7 shows a model of a fiber optic sensor, by means of which the measuring principle according to the invention is explained in more detail.

FIG. 7 shows a model of a fiber optic sensor, by means of which the measuring principle according to the invention is explained in more detail.

Figure 8:
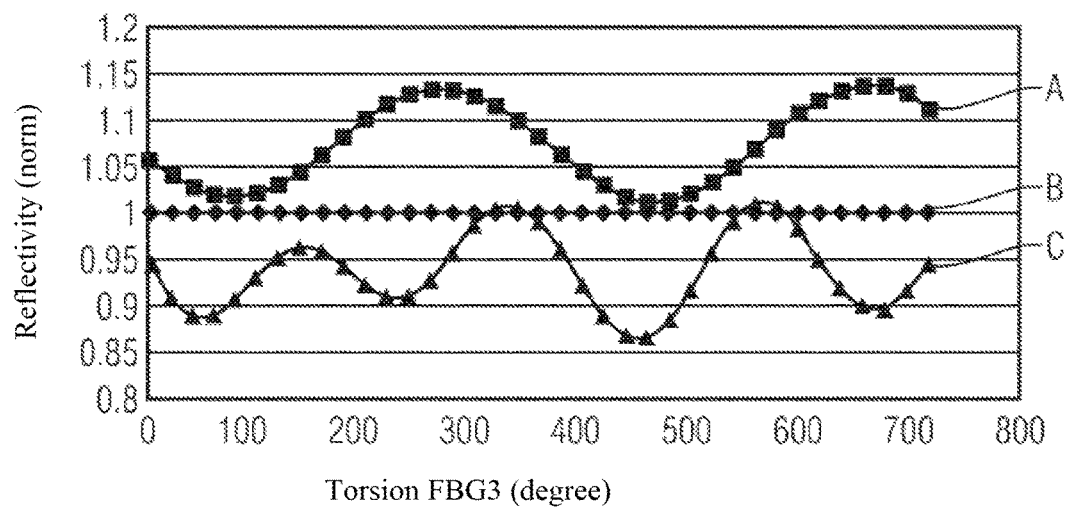
FIG. 8 shows measured values that can be obtained with the sensor according to FIG. 7.

FIG. 8 shows measured values that can be obtained with the sensor according to FIG. 7.

FIG. 1 shows a first embodiment of the invention. FIG. 1 shows a section of a fiber optic sensor 1. The fiber optic sensor 1 contains an optical waveguide 12. The optical waveguide 12 comprises a cladding 10 with a core 11. The cross section in the depicted design example is round, so that the optical waveguide 12 has an approximately cylindrical outer contour.

The first core 11 is disposed concentrically to the cladding 10, i.e. the first core 11 is situated on the axis of symmetry of the optical waveguide 12. The first core 11 extends substantially over the entire length of the optical waveguide 12. This does not rule out that the first core 11 is guided at only one end of the optical waveguide 12 to its end, where the first core is connected to an optical and/or electronic circuit for signal readout and signal generation. At the opposite end, the optical waveguide can also terminate in the material of the cladding 10, so that there is an additional longitudinal section of the optical waveguide 12, in which the first core 11 is absent.

The fiber optical sensor 1 further has two second cores 2. In the depicted design example, a second core is disposed in the upper half of the optical waveguide 12 and a second core 2 is disposed in the lower half of the optical waveguide 12. The actual position within the optical waveguide will be explained in more detail in the following with reference to FIG. 7. Even though two second cores 2 are shown in FIG. 1, they do not necessarily have to lie within the same sectional plane. The refractive index of the second cores differs from the refractive index of the surrounding cladding, so that light can be reflected at the boundary.

Every second core 2 has a first longitudinal section 21, a second longitudinal section 22 and a third longitudinal section 23. The first longitudinal section 21 is adapted to receive light guided in the first core 11 by evanescent coupling. At the same time, light guided in the second core 2 can be transferred to the first core 11 by evanescent coupling.

The third longitudinal section 23 has a greater distance to the first core 11. An optical coupling between the cores in the third longitudinal section 23 is thus avoided. An associated Bragg grating 231a or 231b is found in each third core 23.

The second longitudinal section 22 connects the first longitudinal section 21 with the third longitudinal section 23. As a result, light, which is guided in the first core 11, is conducted over the first longitudinal section 21 and the second longitudinal section 22 and the third longitudinal section 23. There, a portion of the electromagnetic radiation is reflected at the respective Bragg grating 231, so that this portion of light is again conducted through the second longitudinal section 22 into the first longitudinal section 21, where it goes into the first core 11 by means of evanescent coupling. The reflected light propagates on to the end of the waveguide 12, where it can be detected with the aid of a spectrometer.

The wavelength reflected by Bragg grating 231a and 231b depends on the lattice constant of the Bragg grating, which can in turn be affected by mechanical stress. As shown in FIG. 1, a curvature of the optical waveguide 12 causes the lower Bragg grating 231b to compress and the upper Bragg grating 231a to be stretched. The curvature of the optical waveguide 12 can therefore be determined by the change in the reflected spectrum, so that the fiber optic sensor 1 operates as a one-dimensional or multi-dimensional position sensor.

The first core 11 contains another optional Bragg grating 111, which is disposed at approximately the same location on the longitudinal extension of the optical waveguide 12. Since the first core 11 is disposed in the center of the optical waveguide 12, as neutral fiber it does not experience a change in length when the optical fiber 12 bends. If a change in the reflected spectrum is nonetheless detected, it can be attributed to a change in the temperature, and the resulting change in the refractive index and the length of the optical waveguide 12. The measured values obtained at the optional Bragg grating 111 can thus be used for a temperature compensation of the measured values of Bragg gratings 231a and 231b.

FIG. 2 shows the cross section through a second embodiment of the invention. The same components of the invention are given the same reference signs, so that the description is limited to the essential differences.

The fiber optical sensor 1 according to the second embodiment also comprises an optical waveguide 12. A first core 11 is configured in the optical waveguide 12 and is situated on the axis of symmetry, or in the center of the optical waveguide 12. The second cores 2a, 2b, 2c, 2d and 2e are configured in the surrounding cladding 10. These cores do not have to necessarily lie in the sectional plane either, as already explained above.

To couple the light guided in the first core 11 into the second cores 2a, 2b, 2c, 2d and 2e, the first longitudinal sections 21 of the second cores 2 respectively have a geometrical overlap with a partial section 112 of the first core 11. For example, the first longitudinal section 21a of the second core 2a overlaps a longitudinal section 112a of the first core 11. Furthermore, the first longitudinal section 21b of the second core 2b overlaps a longitudinal section 112b of the first core 11. In this way, light that is guided in the first core 11 can simply and with high efficiency be coupled into the second core 2.

The second cores each further has a branch or bifurcation 25. A plurality of second cores 2 can thus have one common first longitudinal section 21. An assigned second longitudinal section 22 and a third longitudinal section 23 then respectively attach to the bifurcation 25.

FIG. 2 further shows that the third longitudinal sections 23 of the second cores 2a, 2c and 2e have a smaller distance a to the axis of symmetry of the optical waveguide 12. In contrast, the third longitudinal sections 23 of the second cores 2b have a greater distance A to the axis of symmetry. The second cores 2a, 2c and 2e can thus detect a large range of curvature or deformation. The second cores 2b are suitable for detecting a smaller range of curvature with a higher resolution and thus higher accuracy.

FIG. 2 lastly shows a second core 2d that is adapted to detect molecules 14. The molecules 14 can be a component of the atmosphere surrounding the optical waveguide or be dissolved in an aqueous solution, in which the optical waveguide 12 is immersed.

The lateral surface 13 has at least one partial surface 131 that has been functionalized, i.e. the partial surface 131 is configured in such a way that the molecules 14 preferentially deposit themselves on this partial surface and/or that the deposition of other molecules on the partial surface 131 is reduced or prevented.

The third longitudinal section 23 of the second core 2g is at a distance of less than 10 µm under the partial surface 13. Light that is guided in the third longitudinal section 23 can at least partially escape from the cladding 10 of the optical waveguide 12 and be resonantly absorbed by the molecules 14. A Bragg grating 231 in the third longitudinal section 231 in the third longitudinal section 23 of the second core 2d is used to filter a wavelength that is selectively absorbed by the molecules 14, and can therefore be used to detect the presence of these molecules.

FIG. 3 shows a section of a third embodiment of a fiber optic sensor. The figure shows a second core 2d, the third longitudinal section 23 of which is guided to near the surface 13 of the cladding 10 of the optical waveguide 12. The third longitudinal section 23 of the second core 2d can, for example, have a distance of less than about 10 µm or less than about 5 µm or less than about 3 µm or less than about 2 µm or less than about 1 µm to the lateral surface 13 of the optical waveguide 12.

A partial surface 131 of the lateral surface 13 can be functionalized to facilitate the absorption of specifiable molecules from the gas phase or an aqueous solution. If the molecules to be detected are bound or adsorbed on the partial surface 131, electromagnetic radiation can excite an electronic transition of the molecule, so that the radiation is absorbed and the adhering molecules can be detected spectroscopically.

In some embodiments of the invention, the two Bragg gratings 231 and 232 have a different lattice constant. Therefore, the two Bragg gratings 231 and 232 reflect different parts of the electromagnetic spectrum that is guided, via the first core 11 and the first longitudinal section 21 of the second core 2d, into the third longitudinal section 23. The intensity ratio can be determined with the evaluation circuit 3, so that the presence of molecules 14 can be directly inferred from the intensity ratio. A greater number of molecules brings about a greater attenuation of the signal, so that the concentration of molecules in the vicinity of the sensor 1 can be inferred from the intensity ratio as well. In other embodiments of the invention, a shift of the wavelength reflected and/or transmitted by the Bragg grating, which is induced by absorbed and/or adsorbed molecules, can be detected with the evaluation circuit 3, to determine the concentration.

FIG. 5 shows an example of the occurrence of torsion on an optical waveguide 12. The optical waveguide has a roughly cylindrical basic shape, as already explained above. For the sake of clarity, the first and second cores are not shown in FIG. 5. A straight line 121 is shown on the surface of the optical waveguide 12, which is to be understood merely as a notionally concept. The same applies to lines 122, which extend from the center of the front sides to the endpoints of the line 121. These lines are shown only to illustrate the torsional stress that is occurring and do not necessarily need to be recognizable in real embodiments of the fiber optic sensor.

FIG. 5a shows the fiber optic sensor 12 in its rest position, i.e. the optical waveguide 12 is not subjected to any torsion.

FIG. 5b shows an example of the occurrence of torsional stress, in which one front side is held in place and the opposite front side is rotated about 180°. As illustrated by line 121 in FIG. 5b, this causes a twist or writhe of the optical waveguide 12 over its length. The task of the invention consists of distinguishing the mechanical stress impressed upon the optical waveguide 12 by this torsion, from the mechanical stress that is caused by deformation or deflection in one of the Cartesian spatial directions X, Y or Z.

The measuring principle underlying the invention is illustrated in more detail in FIG. 6. FIG. 6 shows three cross sections a), b) and c), each with different torsional stress.

Each of the cross sections shown in FIG. 6 shows a first core 11. For the sake of clarity, the cladding surrounding the core 10 of the optical waveguide 12 and the second cores, which can optionally be situated in the cladding, are not depicted.

In the core 11, there is at least one Bragg grating 111 having an elongated cross section. In the depicted design example, the cross section is elliptical. The small and the big semi-axis are both smaller than the diameter of the core 11 in the depicted design example, so that Bragg grating 111 is disposed completely within the interior of the core 11.

FIGS. 6a), 6b) and 6c) each additionally show the polarization direction 20 of a polarized optical wave. The optical wave can be coupled into the first core 11 in a per se known manner, so as to measure or query the Bragg grating in the fiber optic sensor. The mechanical stress and the torsion of the fiber optic sensor can be determined from the reflected or transmitted parts of the optical spectrum, which allows the active forces and/or the shape of the fiber optical sensor to be determined from these parameters. Examples of these measurements are shown in FIG. 4.

FIG. 6a) shows the case in which the polarization direction 20 is perpendicular to the major axis of the elliptical Bragg grating 111. In this case, the reflectivity of Bragg grating 111 is minimal. If torsion of the type illustrated in FIG. 5 acts on the optical waveguide, the angle between the polarization direction 20 and the big semi-axis 115 of the elliptical cross section of Bragg grating 111 changes. FIG. 6b) shows an angle of approximately 45° as an example.

FIG. 6c) shows the case in which the polarization direction 20 is parallel to the big semi-axis 115 of the elliptical cross section of Bragg grating 111. In this case, the reflectivity of the Bragg grating is at its maximum. In the case shown in FIG. 6b), the occurring reflectance would lie between the minimum and the maximum.

FIG. 4 shows measured values that can be obtained with the sensor according to the invention. In each case, the intensity is shown on the ordinate and the wavelength is shown on the abscissa. FIG. 4 a) shows the case of a per se known fiber optic sensor. If there is mechanical stress, the lattice constant of Bragg grating 111 or 231 increases or decreases, resulting in a shift of the wavelength reflected by the Bragg grating by the amount Δλ.

FIG. 4 b) shows an example of a measurement with a sensor according to the invention. It shows the reflected spectrum of four Bragg gratings with different lattice constants. Each fiber Bragg grating reflects a different wavelength range of the electromagnetic spectrum, which results in four roughly equidistant peak values.

Under the effect of mechanical stress or a temperature change the position of these maximum values will shift by an amount Δλ, as has been explained with reference to FIG. 4a).

The action of torsional stress causes the angle between the big semi-axis of the elongated cross section of the Bragg grating and the polarization direction to change. This changes the reflectivity of the Bragg grating, so that the occurrence of torsional stress can be detected through the change of intensity by the amount τ.

FIG. 7 again shows a simple experiment to illustrate the operation of the fiber optic sensor according to the invention. FIG. 7 depicts the measurement setup used, and FIG. 8 shows the measurement results.

FIG. 7 schematically shows a fiber optic sensor 1 having three Bragg gratings 111, 112 and 113. The three Bragg gratings are distributed approximately equidistantly along the length of the fiber optical sensor 1 and have different lattice constants, so that the measuring point, or the location of the respective Bragg grating, can be differentiated based on the reflected wavelength.

The location of Bragg grating 111 is fixed with a clamp, so that no torsion occurs at this point. The opposite end of the fiber optical sensor 1 is subjected to a torsional stress, as illustrated by the arrow shown in FIG. 7. Therefore, the least torsional stress is at the location of Bragg grating 111. The maximum torsional stress is at the location of Bragg grating 113. At the location of Bragg grating 112, the torsional stress has an average value that is affected by the length of the fiber optical sensor 1 and the amount of angular change caused by the torsional stress.

FIG. 8 shows the normalized reflectivity of the respective Bragg gratings 111, 112 and 113 on the ordinate, and the amount of torsion of the end of the fiber optic sensor 1 adjacent to Bragg grating 113 on the abscissa. The angular change or torsion at the location of Bragg grating 113 varies from about 0° to about 720°. The angular change at the location of Bragg grating 111 is 0, i.e. this end of the fiber optic sensor 1 is tightly clamped.

Curve B in FIG. 8 shows the normalized reflectivity of Bragg grating 111. Curve C shows the measured values of the reflectivity for Bragg grating 113, and curve A shows the measured values for the reflectivity of Bragg grating 112.

The normalized reflectivity of Bragg grating 111 is constant at 1.0, i.e. the reflectivity of Bragg grating 111 for polarized light with a specifiable polarization direction does not change with increasing twist or writhe of the optical waveguide.

Curve C shows that torsion of the fiber optic sensor leads to an approximately sinusoidal oscillating reflectivity of Bragg grating 113. The period is 180°.

Curve A shows that Bragg grating 112 experiences only a slight angular change due to the larger distance, so that the measurement signal has a period of approximately 360°.

FIG. 8 therefore shows that the normalized intensity of the light reflected at the Bragg grating is a measure of the angular change at the respective measuring point, which allows the torsion of the fiber optic sensor to be determined.

It goes without saying that the invention is not limited to the embodiments shown in the figures. The foregoing description is therefore not to be considered limiting; it is rather intended to be illustrative. The following claims are intended to be interpreted as meaning that a mentioned feature is present in at least one embodiment of the invention. This does not preclude the presence of other features. If and when the claims and the above description define "first" and "second" features, this terminology serves to differentiate two similar features without specifying an order of precedence.

The invention claimed is:

1. A fiber optic sensor comprising: an optical waveguide, the optical waveguide having at least one first core and a cladding surrounding the first core, wherein the first core extends substantially over the entire length of the optical waveguide and at least one Bragg grating is introduced into the first core,
   wherein
   the at least one Bragg grating has an elongated cross section, wherein the short semi-axis is smaller than the diameter of the first core and the center of gravity of the cross section of the at least one Bragg grating lies on the axis of symmetry of the optical waveguide.

2. The fiber optic sensor of claim 1, wherein both semi-axes are smaller than the diameter of the core.

3. The fiber optic sensor of claim 2, wherein the fiber optic sensor has a plurality of Bragg gratings with elliptical cross sections that are disposed spaced from one another in the first core, wherein the orientation of the elongated cross sections is the same.

4. The fiber optic sensor of claim 3, wherein the lattice constants of the individual Bragg gratings are different from one another.

5. The fiber optic sensor of claim 1, further comprising at least one second core which is at least partially surrounded by the cladding, wherein the longitudinal extension of the second core is less than the total length of the optical waveguide and at least one Bragg grating is introduced into the second core.

6. The fiber optic sensor of claim 5, wherein at least one Bragg grating of the second core has an elongated cross section, wherein the short semi-axis is smaller than the diameter of the second core.

7. The fiber optic sensor of claim 1, wherein the optical waveguide is not polarization-maintaining.

8. A method for determining torsion, in which a fiber optic sensor is used, which has at least one optical waveguide having at least one first core and a cladding surrounding the first core, wherein the first core extends substantially over the entire length of the optical waveguide and at least one Bragg grating is introduced into the first core, wherein the at least one Bragg grating has an elongated cross section, wherein the short semi-axis is smaller than the diameter of the first core, the method comprising:
coupling polarized light, which is at least partially reflected at the at least one Bragg grating, into the optical waveguide; and
determining the intensity of the transmitted or reflected light.

9. The method of claim 8, wherein the fiber optic sensor further comprises at least one second core which is at least partially surrounded by the cladding, wherein the longitudinal extension of the second core is less than the total length of the optical waveguide and at least one Bragg grating is introduced into the second core, so that the shape of the fiber optic sensor in at least one spatial direction is determined in addition to its torsion.

10. The method of claim 8, wherein, with a plurality of Bragg gratings having elliptical cross sections, the torsion of the fiber optic sensor is measured at multiple locations along its longitudinal extension.

11. The method of claim 8, wherein the shape and/or the position of a catheter or an endoscope or a tool in a space is measured.

12. The method of claim 8, wherein light, the polarization direction of which changes over time, is coupled into the fiber optical sensor, wherein the temporal change of the intensity of the light reflected on at least one Bragg grating is measured, and a phase shift between the light that is coupled in and the light that is reflected is determined.

13. The method of claim 8, wherein light, the polarization direction of which changes over time, is coupled into the fiber optical sensor, wherein the temporal change of the intensity of the light reflected on at least two Bragg gratings is measured and used to determine the torsion of the longitudinal section situated between the two Bragg gratings.

14. The method of claim 12, wherein light, the polarization direction of which changes cyclically, in particular sinusoidally, is coupled into the fiber optical sensor.

* * * * *